Feb. 3, 1970   C. I. JOHNSEN   3,493,436
UTILIZING MAGNETIC FLUX IN PRODUCING FUEL CELLS
Filed July 16, 1964

Carsten Ingeman Johnsen
INVENTOR

United States Patent Office 3,493,436
Patented Feb. 3, 1970

3,493,436
UTILIZING MAGNETIC FLUX IN PRODUCING FUEL CELLS
Carsten Ingeman Johnsen, Floral Park, N.Y.
(Sandvigen, Arendal, Norway)
Filed July 16, 1964, Ser. No. 383,047
Int. Cl. H01m 27/00
U.S. Cl. 136—86                                    3 Claims

ABSTRACT OF THE DISCLOSURE

This invention relates to methods for invigorating electrochemical activities in fuel cells by utilizing magnetic flux from an electromagnet, thereby increasing the electrical output from fuel cells.

---

Figure 2:
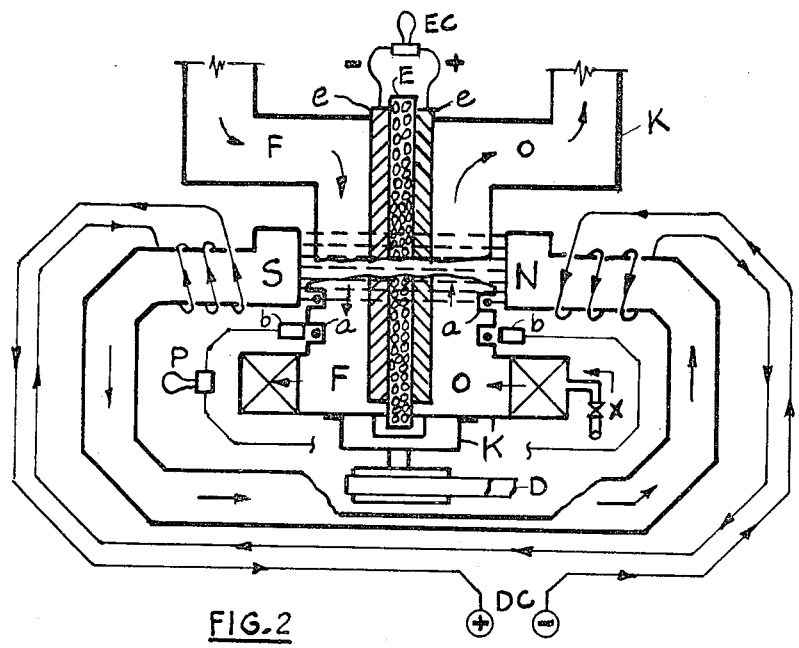

This invention relates to enhancement of electrochemical activity in fuel cells and, more particularly, to a process and apparatus to intensify and augment the direct conversion of fuel values to electrical energy through the medium of fuel cells which comprises the utilization of magnetic flux to invigorate reactivity within the cells.

The principles involved in fuel cells may be considered as requiring the following: two or more substances which are capable of reacting chemically when brought together under proper conditions; a physical separation of these substances by an electrolytic barrier having a composition and internal structure capable of effecting migration of ions of one of said ionized substances through said barrier into and joining the other said substance; resulting in the chemical reaction taking place. If electrodes are provided for the discharge of electrical charges of atoms at barrier boundaries and said electrodes are connected through an external circuit, electrical energy will be made available, continuing until chemical equilibrium is established.

Fuel cells proposed and developed heretofore operate at relatively low efficiencies compared to their theoretical capability. This deficiency is due largely to inability of normal electromotive forces in conventional fuel cells to effect migration of ions in sufficient masses at adequate speeds through said barrier resulting in incomplete utilization of fuels made available. Fuel cell discharges will, therefore, contain an undue proportion of unreacted fuel values contaminated by reaction products.

There is a hope that suitable catalysts may be found to improve celle performance. The novel solution to this lack of vigor of electrochemical activity as herein described and illustrated, is analogous to a chemical catalyst increasing markedly the speed and masses of migrating ions. Causing reactants to flow in opposite directions in their respective fuel cell passages will also be beneficial.

In accordance to my invention, flux from one pole to the other of properly oriented and activated electromagnets is caused to be placed in intimate association with said operative fuel cells, said magnets generating a magnetic field, penetrating, magnetizing and infiltrating said substances in fuel cell passages as well as electrolytic barrier and electrodes whereby electrochemical activity is substantially invigorated and augmented.

According to the generally accepted theory of the structure of matter, its constituent protons, electrons and neutrons behave like magnets, particularly when ionized and free to interact and circulate. This is also true for radioactive particles in air or in a carrying medium. By causing said substances to pass through a properly oriented magnetic field, the speed and masses of ion migration through electrolytic barrier of cell is thereby enhanced and intensified particularly when the direction of lines of force in said magnetic field is caused to be substantially identical with the general direction of flow of migrating ions of said substances. Similarly, radioactivity contaminated particles in a carry medium will be influenced by passage through said magnetic field, discharging particle charges on said electrodes, generating thereby additional electrical energy, while divesting said carrying medium of all or a portion of its radioactivity.

Additional electrical energy may, if desired, be generated and recovered for use by equipping the enclosure of said fuel cell with an armature coil on its periphery as well as brushes connected to an external circuit; then rotating said fuel cell relative to said closely associated magnetic field, thereby generating electrical energy usable for activating said electromagnet while simultaneously electricity is also produced by said operative fuel cell in a separate circuit.

Figure 1:
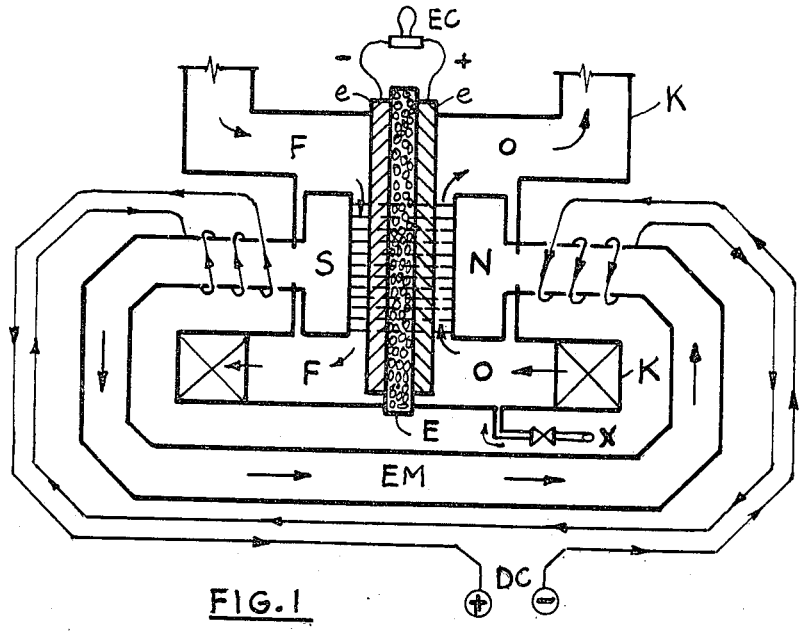

In the accompanying drawing, FIG. 1 illustrates a fuel cell suitable for direct conversion having an enclosure "K," electrolytic barrier "E" and electrode "e" connected through an external circuit "EC." Electromagnet "EM" made operative by coils and leads from a source of electrical energy "DC" is placed in close association with said fuel cell.

During normal operation, a first substance, usually carbonaceous or its derivatives, is caused to flow through passages "F," in the direction indicated by the arrows, while a second substance capable of reacting chemically with the first substance, usually air or oxygen, is caused to flow through passages "O." Said air may be contaminated with radioactive particles.

When one or both of said substances are ionized, ions of the second substance will in a properly designated and operated fuel cell, migrate through electrolytic barrier "E," aided and invigorated by its presence in and passage through the magnetic flux environment induced by electromagnet "EM," said migrated, electrically charged, atoms will react chemically with first substance in "F" to reaction products, usually accompanied by the generation of heat, while electrical charges of ions will be discharged to respective electrodes "e" and made available as electrical energy at "EC."

To overcome fuel cell reaction deficiencies from concentration polarization caused by failure of the residue of the ions to diffuse back to the electrode at the passage "O," a compensating chemical substance may be supplied to passage "O" via pipe "X." For fuel cell reaction $C + O_2 = CO_2$, this added substance may be $CO_2$.

The fragmented portion of FIG. 2 illustrates fuel cell enclosure "K" equipped, when desired, with a coil armature "a." Said enclosure equipped as illustrated, when caused to rotate by drive "D" in magnetic field produced by "EM," electrical energy will be generated, collected by brushes "b" and circuit to "P" while the operating fuel cell manufactures electrical energy made available at "EC," said electrical energy generated by rotation of said armature may be used to activate said electromagnet "EM" or for other purposes.

FIG. 1 on accompanying drawing illustrates an arrangement of said fuel cell and electromagnet "EM" suitable for lower temperatures. Fuel cell "K" consists of an enclosure containing gas passages "O" and fuel passages "F" on opposite sides of an ion-permeable, electrolytic barrier "E" with electrodes "e" at boundaries at said barrier, said electrodes connected through an external circuit "EC" as shown in drawing FIG. 1.

An operative electromagnet "EM" is installed in close proximity to said fuel cell elements, the poles of said magnet oriented with respect to normal direction of flow of migrating ions as described below.

When a gas, for example oxygen, ionized by methods old to the art, is caused to pass into and through gas passages "O," while a fuel, for example carbon monoxide, is caused to pass into and through fuel passages "F"; then because said oxygen and carbon monoxide would react in an exathermic reaction if brought together under the proper conditions; therefore, since it is a wellknown, valuable characteristic of operative fuel cells, that oxygen ions will migrate through said electrolyte and electrodes, reacting in fuel passages "F" with said carbon monoxide generating heat and electrical energy simultaneously in an exathermic reaction $CO + \frac{1}{2} O_2 = CO_2$, electrical energy being available at external circuit "EC."

The said electromagnet "EM" would be installed such that the normal flow of magnetic flux out of the magnets North Pole will pass through electrodes "e" and electrolyte "E" into magnets South Pole "S" whereby said direction of the flow of flux will coincide with direction of ion migration through the same fuel cell elements, aiding said ion migration velocity and enhancing electrochemical activity.

Having explained the principles, preferred construction, a variety of uses and applications as well as the modes of operation involving the beneficial effects of an intimate association of magnetic fields and operative fuel cells, I claim:

1. The method for enhancing the electrical output of producing fuel cells which comprises effecting the intimate association of ions of ionized fuel and oxidant migrating through electrolytic barriers, rotating the fuel cell, and applying a magnetic field by a magnet in which the opposed poles of said magnet are disposed in close proximity to opposite sides of said fuel cell respectively, the affinity of said magnetic field and said ions effecting the generation of magnified energy combinations augmenting ion velocities through said barriers, and stimulating electrochemical activity while enhancing electrical output of said fuel cells.

2. The method as claimed in claim 1, having in addition the step of orienting the poles of said magnet relatively to reaction passages of said fuel cells such that direction of flow of lines of force in said magnetic field is substantially identical with the direction of movement of migrating ions from one reactant, through electrolytic barrier, to the other reactant, when said reactants flow through passages of said fuel cells.

3. The method for generation of electrical energy which comprises effecting rotation of an operative and producing fuel cell equipped with a coil armature on its external periphery, said rotation taking place in a closely associated magnetic field generated by an activated electromagnet, collecting brushes recovering electrical energy from said rotating armature to an external circuit and therefrom made available for use and activation of said electromagnet, *and simultaneously using said fuel cell to produce electrical energy.*

References Cited
UNITED STATES PATENTS

| | | | |
|---|---|---|---|
| 1,182,513 | 5/1916 | Thofehrn | 136—20 |
| 1,217,738 | 2/1917 | Flannery | 136—6 |
| 3,013,098 | 12/1961 | Hunger | 136—86 |
| 3,186,929 | 6/1965 | Rippie | 204—155 |
| 3,303,055 | 2/1967 | Gumucio | 136—86 |

FOREIGN PATENTS

| | | |
|---|---|---|
| 973,217 | 9/1950 | France. |
| 3,834 | 1907 | Great Britain. |
| 16,576 | 10/1962 | Japan. |
| 1,025,234 | 4/1966 | Great Britain. |

ALLEN B. CURTIS, Primary Examiner

M. J. ANDREWS, Assistant Examiner